3,576,697
BUILDING BLOCK FOR DECORATIVE ARTS
Marie E. Lorch, 419 W. Wentworth,
West St. Paul, Minn. 55118
Filed Nov. 15, 1967, Ser. No. 683,181
Int. Cl. B44f 7/00; B23k 1/00
U.S. Cl. 161—19                                   8 Claims

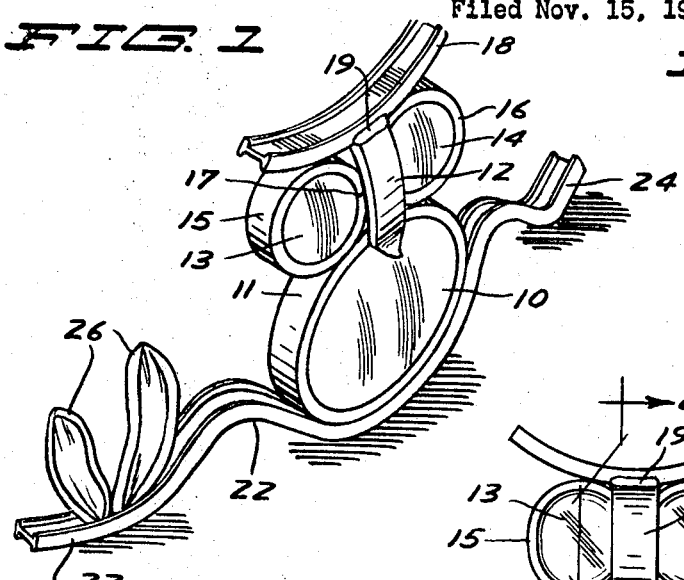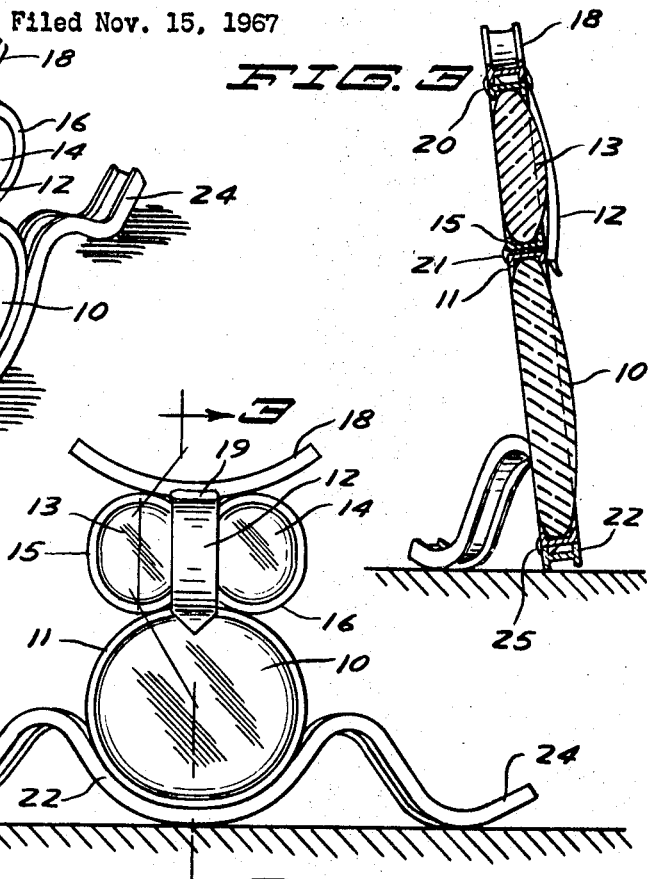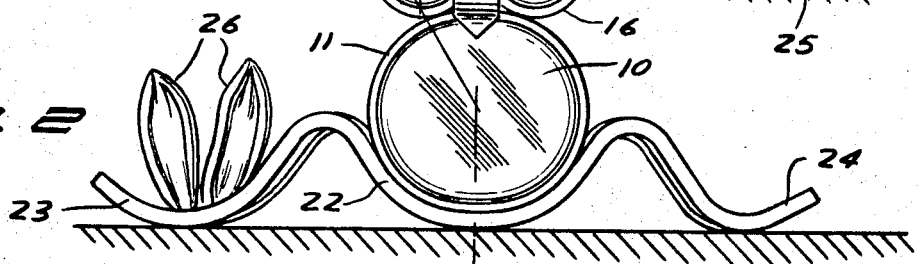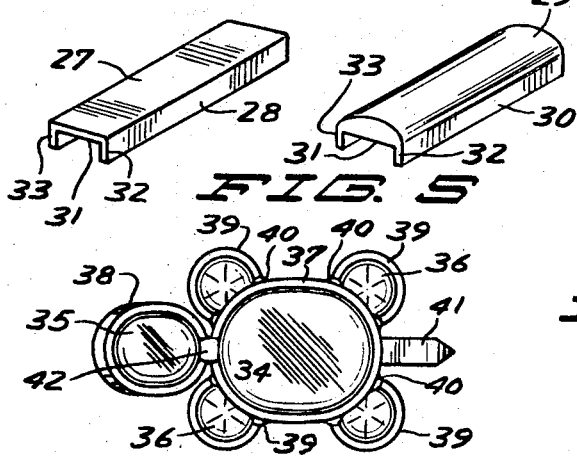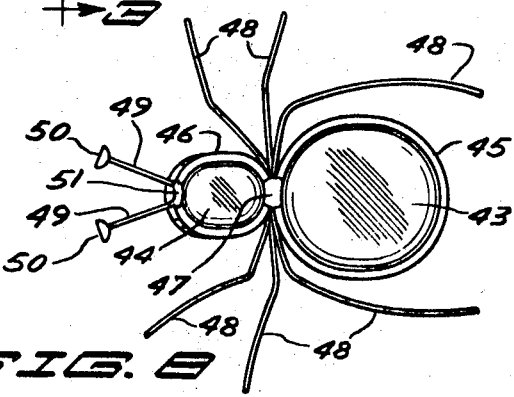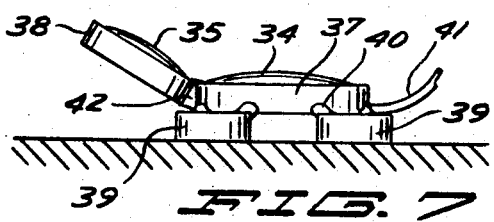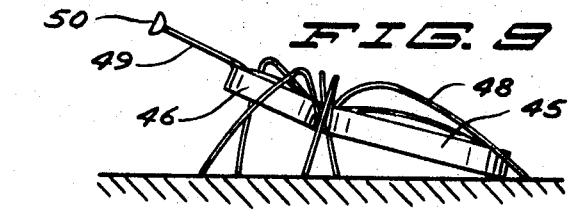
INVENTOR.
MARIE E. LORCH
BY Robert C. Baker
ATTORNEY United States Patent Office 3,576,697
Patented Apr. 27, 1971

ABSTRACT OF THE DISCLOSURE

Decorative objects are taught comprising preformed shapes of solid inorganic material having smooth perimeter edges, flexible strips of grooved lead material circumscribing the same, and solder joints. In the method of making the objects, soldering is accomplished at a low temperature without melting or distortion of the flexible lead.

---

This invention relates to a new mode for artistic endeavor and particularly to unique arrangements of known materials to provide decorative objects. It also relates to a method of making such objects.

The invention is specifically directed to the art of joining together solid inorganic oxide shapes using came material of a particularized variety and in a particularized manner to create objects, such as three dimensional art objects, without being limited to the shape of a base object. The teaching of the invention obviates the hazards associated with amateur cutting of solid sheets of glass, and the resultant creation of sharp edges on larger sections (and also on chips and waste pieces).

Preformed smooth-edged shapes of inorganic oxide, such as ceramic or glass, are of course known. A popular form for glass shapes has been the cylindrical or elliptical or irregularly perimetrical shapes formed by only partially softening glass marbles to cause some flow or slumping and then quickly cooling the slumped material to a solid state. Resulting shapes are more or less flat on one side and have a bulge of gradually increasing height on the other, with the central portion of the shape being approximately the thickest. Perimeter edges are smooth; and they lie in essentially the same plane. These preformed shapes of glass have heretofore been employed in decorative pursuits. For example, they have been glued immediately adjacent each other in a monolayer to an underlying base object of any desired character (such as a bowl or tray or lamp and the like). Then a liquid material has been squeezed in a lattice work between the globules of glass to provide the effect of a leaded lattice about the glass globules. While this approach does provide for decorative results, it is an approach which is limited by the fact that the glass globules must be glued to an underlying base; and therefore the object to be created is limited by the character of the underlying base object.

Lead strips have heretofore been employed in the decorative field; but they have been lead strips with an H-cross section. They have been employed in joining together flat shapes of glass cut from a pane of glass; and by this technique stained glass windows as well as stained glass flat figures have been formed. The technique, however, is limited isasmuch as the glass employed must be cut to the size desired, which introduces a safety hazard and a problem of skill in accomplishing correct cutting. Also limiting is the fact that a single lead strip has invariably, insofar as is known, been used between cut panes of glass to join mating edges of the glass, instead of separate framing of glass pieces as taught herein.

A special feature of the invention is that of employing preformed relatively smooth-edged shapes of solid inorganic oxide material as the building blocks for three-dimensional effects in artistic accomplishment. A further advantage of the invention is that of providing new articles of manufacture consisting essentially of preformed shapes of inorganic oxide with a perimeter frame of special lead shape thereabout. A still further advantage of the invention is the introduction of a new structural arrangement and a new joint arrangement for these lead bordered inorganic oxide shapes. Further advantages of this invention will be apparent as this description proceeds.

The invention will further be described by reference to a drawing, made a part hereof, wherein:

FIG. 1 is a perspective view of one embodiment of the invention, e.g., in the form of an art object resembling an owl;

FIG. 2 is a front plan view of the embodiment shown in FIG. 1;

FIG. 3 is a cross-section of the embodiment of FIG. 1, taken on line 3—3 of FIG. 2;

FIG. 4 is a perspective view of a preferred embodiment for the lead came of the invention;

FIG. 5 is a perspective view of an alternate embodiment for that came;

FIG. 6 is a top plan view of an alternate embodiment of the invention, e.g., in the form of a turtle;

FIG. 7 is a side plane view of the embodiment shown in FIG. 6;

FIG. 8 is a top plan view of a still further embodiment of the invention, e.g., in the form of a caricature of a bug; and FIG. 9 is a side plan view of the embodiment shown in FIG. 8.

Referring to the drawing, the embodiment illustrated in FIGS. 1, 2 and 3 will first be described.

Glass globule 10, suitably a stained glass of a deformed marble as aforedescribed, with smooth perimeter edges lying in the same plane, comprises the main body of the figure. About this glass globule 10 is a flexible band 11 of lead; and this band 11 is formed by wrapping a flexible came having the shape illustrated in FIG. 4 about the smooth perimeter edges of the glass globule 10. The groove of the came is oriented inwardly so that the peripheral edge of the globule 10 is recessed within the groove. Abutting ends of the wrapped strip of came are then united by soldering, as will be described. The joint for the abutting ends of the strip of came forming the band 11 is obscured by the strip of came 12 which forms the nose of the object in FIG. 1.

Similar but smaller (about two-fifths the diameter of the globule 10) glass globules 13 and 14 are used to form the eyes for the object shown in FIGS. 1, 2 and 3. Bands 15 and 16, formed of a flexible strip of came as in FIG. 4, are oriented about the smooth perimeter edges of globules 13 and 14 in the same manner as described for the band 11 about globule 10. The abutting ends of the wrapped strip of came forming band 15 are also united together by solder, as in joint 17 illustrated in FIG. 1.

Bridging over the top of bands 15 and 16, and tangentially solder-united to bands 15 and 16, is crown 18. Crown 18 is suitably formed of a strip of H-shaped flexible lead came, although this is discretionary and not a critical feature of the invention. In essence, crown 18 is an arced section of came; and it is solder-united to bands 15 and 16 at the two tangential areas of contact with those bands.

None of the solder joints thus far described comprise more than a centimeter of solder material extending in any direction. It is preferable to employ solder joints of essentially spot-type character. Even solder joint 19, between the crown 18 and the strip of came forming nose 12, is preferably less than one centimeter in every dimension. This is easily accomplished inasmuch as the came forming the nose or beak 12 is preferably only about a centimeter in width. Of course, where a wider element 12 is employed, a long bead of solder 19 may be employed, if desired. The came forming nose 12 suitably is one of the configuration illustrated in FIG. 4 with the groove underneath and the tip cut to form a point, as illustrated.

It should be noted that the soldering of crown 18 to the contacting portions of the bands 15 and 16 of came about eye elements 13 and 14 is preferably accomplished on the reverse side of the object; and this solder joint is illustrated at numeral 20 in FIG. 3. Likewise, contacting portions of bands 15 and 16 with band 11 are preferably soldered from the reverse side of the figure, as illustrated at numeral 21 in FIG. 3.

As the support for the object in FIG. 1, a strip of came, suitably of H-shape as illustrated but not necessarily of such shape, is curved about the lower one-fourth to one-half of the band of came 11 surrounding the glass shape 10 and then bent rearwardly of the figure and curved downwardly to form leg pedestals 23 and 24. Pedestals 23 and 24 cooperate with the stretch of came 22 about the lower portion of band 11 to form three points of a triangular support for the object. A bead of solder 25 joins or unites the stretch of came 22 to the bottom of the band 11 (see FIG. 3). If desired, leaf elements 26 may be solder-attached to any suitable position along the strip of came 22 for asymmetrical effect.

The came illustrated in FIG. 4 has a flat outer surface portion 27 which becomes the outer circumferential surface portion of the came as it is positioned about glass shapes 10, 13 and 14. Perpendicular to those flat outer surface 27 are flat side or lateral surfaces, illustrated for one side by numeral 28 in the drawing; and these side or lateral surfaces become radial lateral surfaces of the came as it is fitted about the glass shapes aforedescribed. The feature of the came in FIG. 5 which distinguishes it from the came in FIG. 4 is its curved or arced outer surface or circumferential surface 29. This curve suitably may extend to the side surface as at numeral 30 in FIG. 5; and alternately, the side or lateral surfaces may be flat without significant curvature. The strips of came illustrated in FIGS. 4 and 5 are both equipped with a groove 31 which preferably has a right angle configuration extending the strip of the came. In some cases this right angle effect may be rounded to such an extent that the groove in the came is essentially without sharp corners and is of the nature of a smooth indentation from one leg 32 to the other leg 33 of the came.

The objects in the remaining figures of the drawing likewise are formed of solid inorganic oxide shapes having essentially smooth perimeter edges lying in the same plane and lead came of the type illustrated, with additional elements being added in FIGS. 8 and 9.

Briefly, the turtle of FIGS. 6 and 7 comprises solid shapes 34 and 35 with the flexible lead came of FIG. 4 wrapped thereabout to form bands 37 and 38. The meeting ends of the wrapped came is obscured by solder joint 42, which joins the article consisting of shape 35 and band 38 at an angle of about 140–165° to the article consisting of shape 34 and band 37. Thus an additional three-dimensional feature is created which critically resides in the angularity between the body and head of the object. Further, three-dimensional results are achieved by joining leg elements, formed of faceted inorganic shapes 36 and flexible came bands 39, to the body (which consists of shape 34 and band 37) by means of uniting the side or lateral surfaces of the came forming band 37 and bands 39. Thus, the bands 39, formed of the flexible lead came illustrated in FIG. 4 (or alternately the came illustrated in FIG. 5), with the meeting ends of the wrapped came 39 solder united and obscured in the figure by the body 34 and 37, are placed with their upper lateral surface, in the solder-united portion thereof, in contact with a stretch of the lower lateral surface of band 37, with the shapes 36 laterally displaced and projecting away from shape 34. In this position the bands 39 are united by solder 40 at their lateral surface to the underlying lateral surface of band 37. The result is that shapes 36 lie in a different and lower plane than shape 34. Faceted shapes 36, although polished to give the facets as illustrated, are provided with a relatively smooth peripheral edge, all the points of which, as in the case of the globules 34 and 35, lie in essentially the same plane. Tail 41, formed of the flexible came in FIG. 4, is suitably solder-united to band 37 as illustrated.

The bug of FIGS. 8 and 9 has a body consisting of globule 43 with band 45 of flexible came (as illustrated in FIG. 4), and a head consisting of globule 44 held in a similar band 46 of flexible came. These two parts are formed as aforedescribed, with the solder-united meeting edges of the wrapped came obscured by solder joint 47. Legs 48, suitably of wire having a composition analogous to the came are solder-united to the object at the bead 47 of solder. Antenna 49, also of similar wire, with a bead 50 of solder at their outermost extremity, are held in place by a bead 51 of solder at the anterior portion of band 46 which holds the head element 44.

All inorganic oxide shapes useful according to the invention have perimeter edges of essentially smooth character (that is, a perimeter edge which is not a sharp cutting edge such as one gains by breaking glass into smaller pieces). Also, all points of the perimeter edge for these shapes lie in essentially the same plane. These inorganic shapes may be either ceramic, cermet or glass or the like. Usually, they contain at least about 40 or 50% silica, with alkali or alkaline earth fluxes, plus coloring matter (e.g., cobalt blue, chrome yellow, etc.). Colored soda-lime-silicate glass shapes are very ideal. Globules of the character formed by softening and allowing some flow of the glass of colored spherical marbles (e.g., soda-lime-silicate glass) are preferred; but it is also contemplated that globules which have a bulge on each side (formed in dies) instead on one side, are useful according to the invention. Faceted globules are also useful, provided they are not equipped with sharp cutting edges. For maximum attainment of three-dimensional decorative effects, it is essential that the preformed shapes have a non-uniform thickness, with the thickest portion thereof usually being near the center portion approximately equidistant from the perimeter edges thereof. If desired, shapes may consist of heat-resistant thermoset resinous material.

Lead came employed in the invention has a longitudinal groove along one side thereof and is relatively smooth surfaced on the exterior portions thereof apart from the noted groove. It may even be elliptical or circular in the exterior portions apart from the groove; but the preferred lead came is of a shape which has right angled surfaces in over-all cross-section, with a longitudinal groove in one side. Preferably, each lateral side (see 28 and 30 in drawing) is no wider than one-half or even ⅓ the width of the surface joining leg elements 32 and 33. The width of the surface joining leg elements 32 and 33 is at least ¼ cm. wide up to about 1 cm. wide. The most versatile came is about ½ cm. wide.

The came does not merely consist of lead (that is, it does not merely consist of lead with the usual impurities contained in commercial lead). It consists of lead, suitably the commercial variety, with at least 0.03% by weight up to about 5 or 10% or even 15% of one or more of antimony, zinc, silver, copper, tin and the like alloyed therewith. A preferred form of lead composition for the came is one consisting of lead, suitably as commercially available with slight impurities, plus 0.03 to 1.5% by weight antimony, and usually an optional content (e.g., 0.01 to 5% by weight) of zinc, silver, copper or tin or any combination of these. Copper is desirable to introduce a sheen of luxurious character to the came.

In the step of soldering the lead came, common fluxes are useful such as the acids and rosins normally employed in soldering. The critical features of soldering are that the temperature must not approach the melting temperature for the lead came (which may be as low as about 550° F. or as high as about 620° F.), and the soldering materials employed must readily flow at a temperature no greater than 500° F. and wet as dictated by flux treatment without running in an uncontrolled manner. The solder material employed will normally contain a proportion of lead which under all circumstances will never exceed about 60% by weight of the solder, a quantity of tin which may account for as much as 40% or even up to 90 or 95% of the solder, an optional but preferred content of silver normally not exceeding 5 to 10% by weight of the solder, an optional preferred content of antimony normally not exceeding 3 to 10% by weight of the solder, and finally an optional content of zinc, copper and a variety of other metals normally not present more than 5% or possibly up to 10% by weight of the composition. For effective soldering in the critically small areas as required without disruption or melting of the came, a needle-like soldering tool has been found to be the most practical.

An extremely important feature of the invention which has been stressed hereinabove is that of holding globules of inorganic matter and essentially framing them and holding them by means of the single strip of came about the smooth peripheral edges thereof. These elements serve as the building blocks for the artistic objects, permitting entirely new combinations not possible when employing the particular type of came and the panes of glass characteristic of the prior art.

That which is claimed is:

1. As a new article of manufacture for use as a building block in the decorative arts: a preformed shape of solid inorganic oxide material having a smooth perimeter edge lying essentially in a single plane and a variable thickness perpendicular to the plane of said perimeter edge, the approximate center of the plane enclosed by the perimeter of said shape being the thickest portion of said shape, and a band of flexible lead metal material consisting of at least 85% lead by weight snugly framing said shape about the perimeter edge thereof, said band of flexible lead metal material being formed by solder-uniting abutting ends of a single strip of said material wrapped about said shape, said solder containing no more than 60% lead by weight, said strip being characterized by having a single longitudinal groove into which the perimeter edge of said shape is recessed.

2. The article of claim 1 wherein the shape is glass analyzing to contain at least 50% silica by weight.

3. The article of claim 1 wherein the strip is further characterized by having a flat configuration on its outer exposed circumferential and lateral surfaces.

4. The article of claim 1 having, in addition a further strip of grooved flexible lead metal material abutting against said band annularly about said shape, said further strip being soldered to said band in a minute area not in excess of one centimeter in any dimension.

5. The article of claim 4 wherein the further strip is a grooved strip and annularly circumscribes and holds a second preformed shape of solid inorganic oxide material.

6. As a new article of manufacture for use as a building block in the decorative arts: a preformed shape of heat-resistant thermoset resinous material having a smooth perimeter edge lying essentially in a single plane and a variable thickness perpendicular to the plane of said perimeter edge, the approximate center of the plane enclosed by the perimeter of said shape being the thickest portion of said shape, and a band of flexible lead metal material consisting of at least 85% lead by weight snugly framing said shape about the perimeter edge thereof, said band of flexible lead metal material being formed by solder-uniting abutting ends of a single strip of said material wrapped about said shape, said solder containing no more than 60% lead by weight, said strip being characterized by having a single longitudinal groove into which the perimeter edge of said shape is recessed.

7. The article of claim 6 having, in addition, a further strip of flexible lead metal material abutting against said band annularly about said shape, said further strip being soldered to said band in a minute area not in excess of one centimeter in any dimension.

8. The article of claim 7 wherein the further strip is a grooved strip and annularly circumscribes and holds a second preformed shape of heat-resistant thermoset resinous material.

References Cited
UNITED STATES PATENTS 1,534,684    8/1922    Chilson _____ 63—18
1,660,460    2/1928    Weiner _____ 161—19

JOHN T. GOOLKASIAN, Primary Examiner

L. T. KENDALL, Assistant Examiner

U.S. Cl. X.R.

29—473.7, 475; 63—18, 20